US008589712B2

(12) United States Patent
Vanderwiel

(10) Patent No.: US 8,589,712 B2
(45) Date of Patent: *Nov. 19, 2013

(54) DETERMINING A POWER SAVING MODE BASED ON A HARDWARE RESOURCE UTILIZATION TREND

(71) Applicant: International Business Machines Corporation, Armonk, NY (US)

(72) Inventor: Mark R. Vanderwiel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,602

(22) Filed: Nov. 20, 2012

(65) Prior Publication Data

US 2013/0091947 A1 Apr. 18, 2013

Related U.S. Application Data

(63) Continuation of application No. 12/946,350, filed on Nov. 15, 2010.

(51) Int. Cl.
*G06F 1/32* (2006.01)

(52) U.S. Cl.
USPC .......................................... 713/323; 713/324

(58) Field of Classification Search
USPC .................................................. 713/323, 324
See application file for complete search history.

(56) References Cited

U.S. PATENT DOCUMENTS

| 5,721,936 | A | 2/1998 | Kikinis et al. |
| 6,654,895 | B1 | 11/2003 | Henkhaus et al. |
| 7,120,911 | B1 | 10/2006 | Katayama |
| 7,529,958 | B2 | 5/2009 | Roth et al. |
| 7,565,562 | B2 | 7/2009 | Chary |
| 2005/0273636 | A1 | 12/2005 | Grobman |
| 2008/0201591 | A1 | 8/2008 | Hu et al. |
| 2012/0124402 | A1 | 5/2012 | Vanderwiel |

OTHER PUBLICATIONS

Broyles, Martha et al., IBM EnergyScale for POWER7 Processor-Based Systems, IBM white paper, Feb. 2010, IBM Corporation, Somers, United States.

*Primary Examiner* — Thuan Du
(74) *Attorney, Agent, or Firm* — Patterson & Sheridan LLP

(57) ABSTRACT

Techniques are disclosed for managing the amount of power consumed by server components of a computer system, each server component having multiple power modes. The utilization of each server component is monitored. Based on the monitored utilization, a time period is determined in which to apply a selected power mode to the respective server component. The respective server component is configured to operate in the selected power mode for at least the determined time period.

20 Claims, 4 Drawing Sheets

|  | CPU | Memory | Disk |
|---|---|---|---|
| Tuesdays | Mode $c_2$ | Mode $m_1$ | Mode $d_1$ |
| Fridays | Mode $c_1$ | Mode $m_1$ | Mode $d_2$ |
| Other Days | Mode $c_2$ | Mode $m_2$ | Mode $d_2$ |

FIG. 3

DETERMINING A POWER SAVING MODE BASED ON A HARDWARE RESOURCE UTILIZATION TREND

CROSS-REFERENCE TO RELATED APPLICATIONS

This application is a continuation of co-pending U.S. patent application Ser. No. 12/946,350, filed Nov. 15, 2010. The aforementioned related patent application is herein incorporated by reference in its entirety.

BACKGROUND

Users often seek to manage an amount of power consumed by computer systems in order to reduce costs associated with operating the computer systems. Reducing the amount of power consumed by a computer system may also result in the computer system becoming eligible for environmental impact standards or labels, such as the Energy Star rating system established by the United States Department of Energy and the Environmental Protection Agency. In addition, the amount of heat produced by a computer system is usually proportional to the amount of power consumed by the computer system. Thus, reducing the amount of power consumed may also reduce the amount of heat produced by the computer system. A computer system that produces less heat may be even more energy efficient because less power is required to operate cooling systems used to dissipate the heat produced by the computer system. Furthermore, energy efficient computer systems may pose fewer design constraints related to overheating.

SUMMARY

Embodiments of the invention provide a computer-implemented method, computer program product, and system for performing an operation that includes monitoring utilization of a server component having a plurality of power modes and operating in a first power mode of the plurality of power modes. The operation also includes determining a time period in which to apply a second power mode from the plurality of power modes to the server component, based on the monitored utilization of the server component. The operation also includes configuring the server component to operate in the second power mode for at least the determined time period.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 3 illustrates exemplary power management policies, according to one embodiment of the invention.

DETAILED DESCRIPTION

Figure 1:
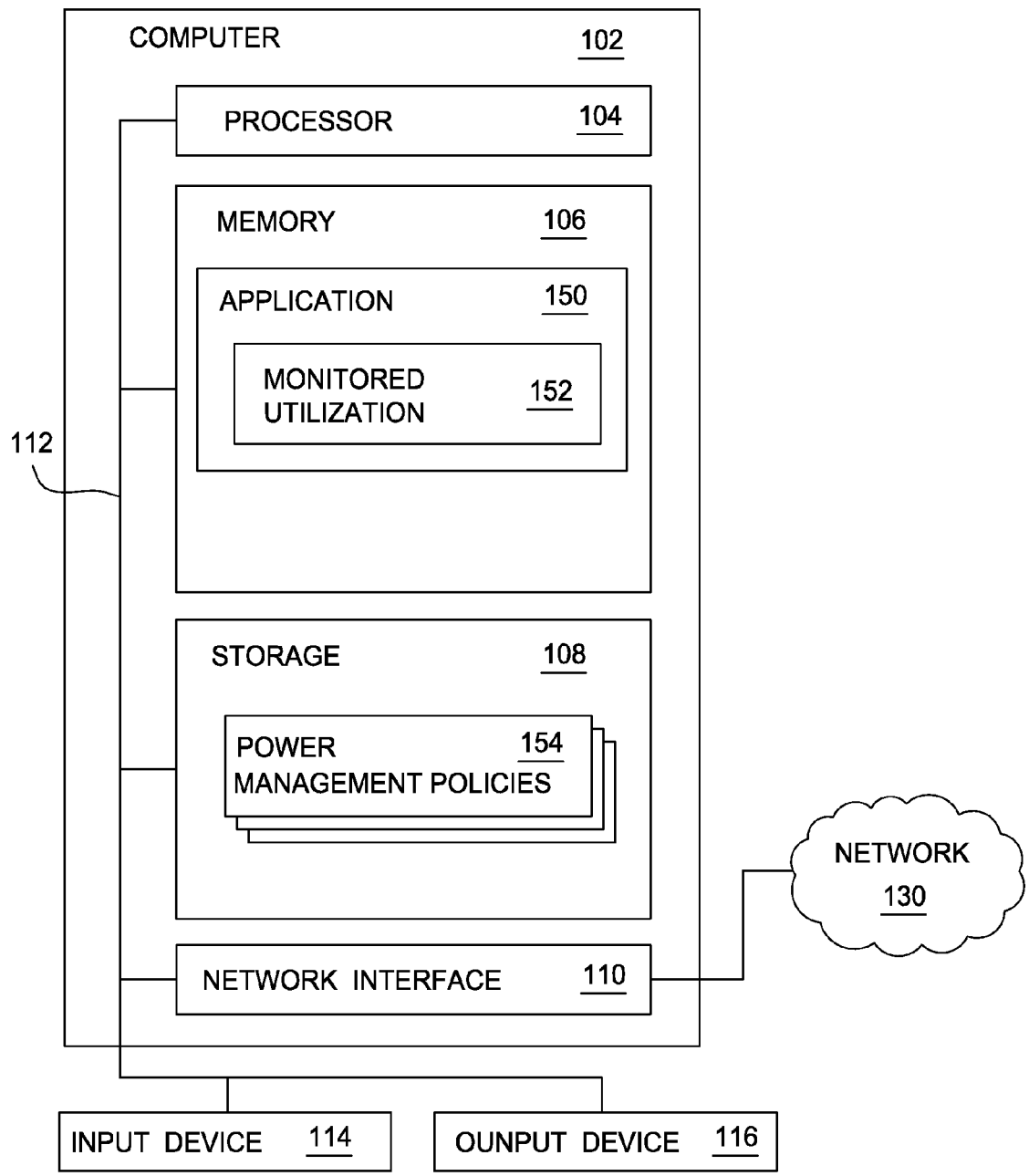
FIG. 1 is a block diagram illustrating a system for managing an amount of power consumed a server component, according to one embodiment of the invention.

Embodiments of the invention generally provide techniques for managing the amount of power consumed by a server component having multiple power modes including a first power mode and a second power mode. One embodiment provides an application for power management. The application monitors utilization of the server component that is in the first power mode. Based on the monitored utilization, the application determines a time period (i.e., a duration of time) for which the server component should operate in a second power mode. The application then configures the server component to be in the second power mode for the determined time period. Advantageously, when managed by the application, the server component is configured to be in a more energy-efficient power mode at times of lower utilization. Further, in a computer system with multiple server components, each with a corresponding set of power modes, the application may independently manage the amount of power consumed by each of the server components. Accordingly, a server component in a computer system may be configured to operate in a more energy-efficient power mode when the server component has a lower utilization relative to other time periods—even when other server components in the computer system have a higher utilization, relative to other time periods. Advantageously, the computer system may operate more cost-efficiently at least in some cases, thereby improving cost savings and/or conservation of natural resources.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the application for power management could execute on a computing system in the cloud and manage the amount of power consumed by server components of a second computing system inside or outside of the cloud. In such a case, the application could determine suitable power modes and time periods for each of the server components and store a power management policy at a storage location in the cloud, where the power management policy specifies the determined power modes and/or time periods. Doing so allows the power management policy to be accessed from any computing system attached to a network connected to the cloud (e.g., the Internet). For example, via the network, the power management policy may be shared with another instance of the application for power management executing on another computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for managing an amount of power consumed a server component, according to one embodiment of the invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, solid-state drives, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150, and the storage 108 of the computer 102 includes power management policies 154. As described above, the application manages the amount of power consumed by one or more server components. As used herein, a server component refers to any identifiable hardware component of a server system, such as the processor 104, the memory 106, the storage 108, the network interface 110, the input device 114, or the output device 116. Although the application 150 is shown to be executing on the computer 102, in another embodiment, the application 150 executes on a different computer that communicates with the computer 102 via the network 130.

In one embodiment, each server component may be configured to operate in one of a plurality of predefined power modes specific to the respective server component. The predefined power modes that are available for a given server component may be specified by a designer of the server component. Each power mode may available for the server component may be characterized by a different amount of power consumed by the server component, when operating in the respective power mode. Depending on the embodiment and/or the server component, the amount of power consumed by the server component may be reduced by adjusting a voltage applied to the server component, adjusting a frequency of a clock signal applied to the server component, and/or completely or partially disabling one or more hardware modules within the server component.

In one embodiment, the application 150 monitors utilization of the server component having multiple power modes and operating under a first power mode. The utilization of the server component may refer to a frequency with which instructions are processed (e.g., if the server component is a processor), a frequency with which a memory or storage is read from and/or written to (e.g., if the server component is a memory or a storage), a rate at which data is sent or received (e.g., if the server component is a network interface), etc. Depending on the embodiment, the utilization of the server component may refer to other operating parameters of the server component (e.g., the amount of memory in use, if the server component is a memory, or the revolutions per minute (rpm) at which a hard disk is spinning, if the server component is a hard disk), including whether one or more modules within the server component have been disabled.

In one embodiment, based on the monitored utilization 152, the application 150 determines a time period in which the server component is to operate under a second power mode that is different from the first power mode. Depending on the embodiment, one or both of the time period and/or the second power mode are determined from the monitored utilization 152. The application 150 then configures the server component to be in the second power mode for the determined time period. For example, the application 150 may create or modify the power management policy 154 using the second power mode and/or the determined time period. The application 150 may then apply the power management policy 154 to the server component.

In one embodiment, the application 150 may also maintain the power management policy 154 over time. For example, the application 150 may subsequently adjust the power management policy 154 to accommodate changes in utilization trends of the server component. For example, the time period and/or power mode specified by the power management policy 154 may be modified. Further, the power management policy 154 may be modified to incorporate additional time periods and power modes. By operating in accordance with the power management policy 154 maintained by the application 150, the server component may operate in a more cost-efficient manner. The application 150 may also manage multiple server components of a computer system independently of one another, so that the computer system operates in an even more cost-efficient manner.

Figure 2A:
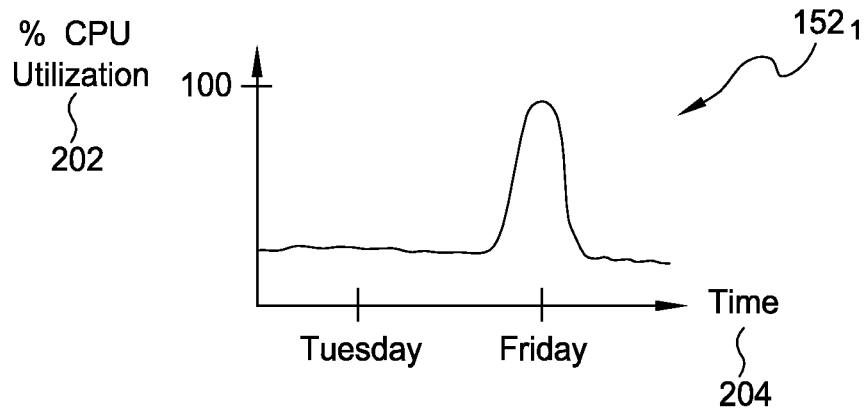
FIGS. 2A-2C illustrate an exemplary monitored utilization, according to one embodiment of the invention.
Figure 2B:
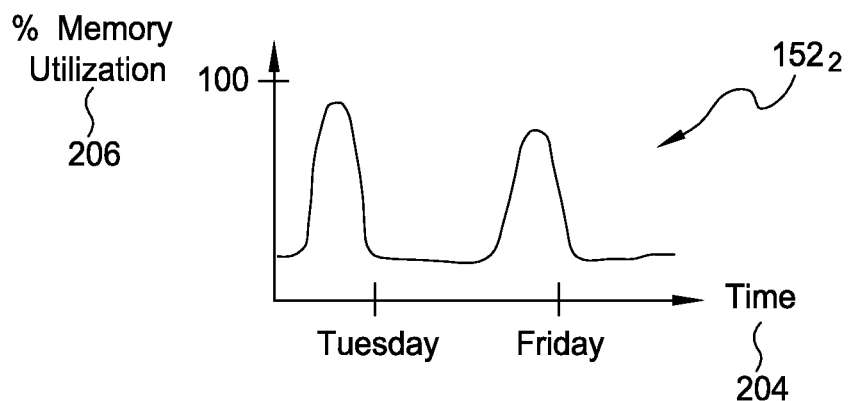
Figure 2C:
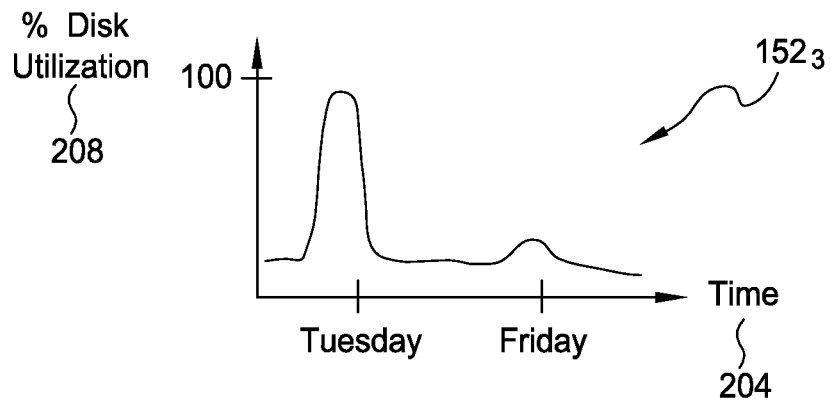

FIGS. 2A-2C illustrate the monitored utilization 152 of FIG. 1, according to one embodiment of the invention. Assume that the application 150 is monitoring utilization of server components that include the processor 104, the memory 106, and the storage 108 of the computer 102, respectively. Assume also that each server component has a plurality of power modes. Further, assume that the computer 102 performs weekly backups on Tuesdays and executes a computationally intensive payroll application on Thursdays.

As shown in FIG. 2A, which plots CPU utilization 202 against time 204, the monitored utilization $152_1$ indicates that the processor 104 has a higher utilization on Fridays, relative to other days of the week. Similarly, as shown in FIG. 2B, which plots memory utilization 206 against time 204, the monitored utilization $152_2$ indicates that the memory 106 has a higher utilization on Tuesdays and Fridays, relative to other days of the week. Further, as shown in FIG. 2C, which plots disk utilization 208 against time 204, the monitored utilization $152_3$ indicates that the storage 108 has a higher utilization on Tuesdays, relative to other days of the week. Based on the monitored utilization 152, the application 150 may configure each of the server components to apply power modes such that the computer 102 operates in a more cost-efficient manner. To this end, the application 150 may create one or more power management policies 154.

FIG. 3 illustrates the power management policies 154 of FIG. 1, according to one embodiment of the invention. As shown, the power management policies 154 include a first power management policy 304 for the processor 104, a second power management policy 306 for the memory 106, and a third power management policy 308 for the storage 108. The power management policy 154 for each server component specifies a power mode for the respective component based on the day of the week. Those skilled in the art will recognize that the power management policy 154 may alternatively specify a power mode based on any specified time frame, which may be recurring or non-recurring.

Assume that at the time of being monitored by the application 150, each of the server components is operating in a first respective power mode. Specifically, suppose that the processor 104 is operating in a power mode $c_1$, the memory is operating in a power mode $m_1$, and the storage is operating in a power mode $d_1$. In one embodiment, based on the monitored utilization $152_{1-3}$ of FIGS. 2A-2C, the application 150 determines, for each of the server components, a period of time in which to apply a different power mode. For example, as shown in FIG. 3, the application 150 may determine to apply a second power mode $c_2$ to the processor 104 on Saturdays through Thursdays, such that the processor 104 consumes less power on days of lower utilization of the processor 104.

Similarly, in one embodiment, the application 150 may determine to apply a second power mode $m_2$ to the memory 106 on Wednesdays through Thursdays and Saturdays through Mondays, such that the memory 106 consumes less power on days of lower utilization of the memory 106. Further, the application 150 may determine to apply a second power mode $d_2$ to the storage 108 on Wednesdays through Mondays, such that the storage 108 consumes less power on days of lower utilization of the storage 108. Advantageously, the storage 108 may be configured to consume less power at a time of low utilization of the storage 108 (e.g., Fridays)—even though another server component, such as the processor 104, may be experiencing a high utilization at that time. Accordingly, the application 150 may independently and programmatically manage the amount of power consumed by each server component of the computer 102. As a result, the computer 102 may operate in a more cost-efficient manner.

Although the power management policies 154 of FIG. 3 have been described with reference to two power modes per server component, depending on the embodiment, the application 150 may determine to apply a third power mode a server component and so forth, up to a total count of power modes supported by the server component. For example, the monitored utilization $152_2$ of the memory 106 of FIG. 2B indicates that the memory is slightly underutilized on Fridays, relative to Tuesdays. Accordingly, the application 150 may apply a third power mode $m_3$ (rather than $m_1$) to the memory 106 on Fridays, such that the memory 106 consumes slightly less power than on Tuesdays but more power than on other days of the week. In some embodiments, a server component may support a specified percentage of power to consume, relative to a predefined maximum amount of power that the server component consumes.

Additionally or alternatively, the server component may also support an amount of power to consume, where the amount is specified in terms of units of power such as watts (W). In such cases, each power mode may be associated with the specified percentage of power or the specified amount of power. In other words, the total count of power modes supported by the server component is proportional to the granularity with which the percentage of power (or the amount of power) may be specified. For example, where a server component supports any natural-number percentage of power between forty-one percent and one hundred percent, inclusive, then each distinct percentage corresponds to a distinct power mode supported by the server component, for a total of sixty power modes.

At least in some cases, configuring a server component to consume less power may result in decreased performance and/or increased response times of an application that uses the server component. Decreasing performance of the application to reduce power consumption in return for cost savings may often be an acceptable tradeoff to make. In some cases, however, the application may be a performance-critical application that has stringent response time requirements and that may not necessarily be computationally expensive to execute. In such cases, it may be unacceptable to decrease performance of the application for the cost savings. Accordingly, in one embodiment, the application 150 maintains a registry of applications that execute on the computer 102. An administrative user may modify the registry to indicate which applications are performance-critical applications. The application 150 may then use the registry in determining the time period in which to apply a different power mode to a server component. Specifically, the application 150 may refrain from configuring the server component to consume less power during a timeframe in which one or more performance-critical applications are executing.

For example, referring once again to FIG. 2A, assume that a performance-critical application executes on Tuesdays. Instead of applying a power mode $c_2$ to the processor 104 such that the processor 104 consumes less power on Tuesdays, the application may apply the same power mode $c_1$ to the processor 104 on Tuesdays and Fridays. In other words, although Tuesdays are days of low utilization of the processor 104, Tuesdays are also days during which the performance-critical application executes. Accordingly, the processor 104 may be configured to operate in a power mode normally reserved for days of high utilization of the processor 104 (e.g., Fridays).

In some embodiments, the administrative user may also manually specify: (i) a time period and (ii) a power mode for the time period, to account for high or low utilization periods that the administrative user is aware of and that have not necessarily been identified by the application 150. The manually specified time periods and/or power modes may apply to the computer 102 overall or to a specific component of the computer 102 (e.g., the processor 104, the memory 106, etc.). The time periods and/or power modes may be stored as a preset for use by the application 150. For example, the time periods and/or power modes may be stored in the registry of applications or as a power management policy 154 used by the application 150. The preset may also be used to override an existing power management policy 154 created by the application 150. Accordingly, in addition to applying power modes determined as a result of monitoring server component utilization, the application 150 may also apply suitable power modes to one or more components according to presets specified by the administrative user. Advantageously, the application 150 provides the administrative user with improved flexibility in managing power consumption of server components of the server system.

Figure 4:
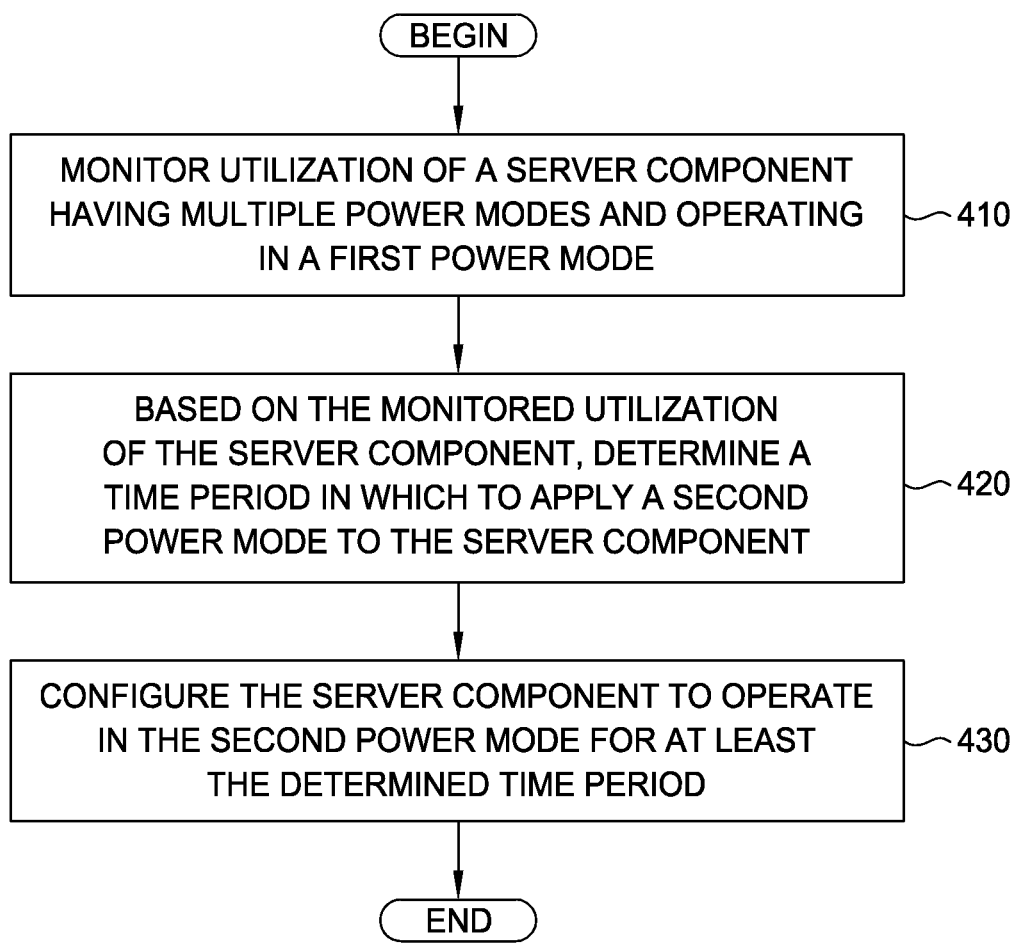
FIG. 4 is a flowchart depicting a method for managing an amount of power consumed by a server component having multiple power modes and operating in a first power mode, according to one embodiment of the invention.

FIG. 4 is a flowchart depicting a method 400 for managing an amount of power consumed by a server component having multiple power modes and operating in a first power mode, according to one embodiment of the invention. As shown, the method 400 begins at step 410, where the application 150 monitors utilization of the server component. For example, the application 150 may monitor utilization of the storage 108 to generate the monitored utilization $152_3$ of FIG. 2C. At step 420, the application 150 determines a time period during which the server component is to operate in a second power mode. Both the time period and the second power mode may be selected based on the monitored utilization of the server component. For example, the application 150 may determine to apply power mode $d_2$ to the storage 108 Wednesdays through Mondays. At step 430, the application 150 configures the server component to operate in the second power mode for at least the determined time period. For example, the application 150 may create a power management policy 308 for the storage 108, as shown in FIG. 3. After the step 430, the method 400 terminates.

Advantageously, embodiments of the invention provide techniques for managing the amount of power consumed by server components of a server system, each server component having multiple power modes. One embodiment provides an application for power management. The application monitors utilization of each server component. Based on the monitored utilization, the application determines a time period in which to apply a different power mode to the respective server component. The application then configures respective server component to be in the different power mode for the determined time period. Accordingly, the application may independently and programmatically manage the amount of power consumed by each server component of a computer system. As a result, the computer system may operate more cost-efficiently.

While the foregoing is directed to embodiments of the present invention, other and further embodiments of the invention may be devised without departing from the basic scope thereof, and the scope thereof is determined by the claims that follow.

What is claimed is:

1. A computer-implemented method to manage power consumed by server components having multiple power modes, the method comprising:
   monitoring utilization of a first server component having a plurality of power modes and operating in a first power mode of the plurality of power modes;
   determining a time period in which to apply a second power mode from the plurality of power modes to the first server component, wherein the second power mode and the time period in which to apply the second power mode are each determined based on the monitored utilization of the first server component and based further on an application registry specifying one or more time periods during which one or more performance-critical applications are executing and using the first server component; and
   by operation of one or more computer processors, configuring the first server component to operate in the second power mode for at least the determined time period.

2. The computer-implemented method of claim 1, wherein the second power mode is determined by an application configured to independently determine, for each individual server component selected from a computer processor, a memory, a storage device, a network component, an input device, and an output device, the time period in which to apply the second power mode to the respective server component, based on the monitored utilization of the respective server component.

3. The computer-implemented method of claim 1, wherein the time period is characterized by a lower level of utilization of the first server component, relative to other time periods.

4. The computer-implemented method of claim 1, whereby the first server component consumes a reduced amount of power during the time period while being in the second power mode, relative to the first power mode.

5. The computer-implemented method of claim 1, wherein each of the plurality of power modes is characterized by a different amount of power consumed by the first server component.

6. The computer-implemented method of claim 1, further comprising:
   monitoring utilization of a second server component having a second plurality of power modes and operating in a first power mode of the second plurality of power modes;
   based on the monitored utilization of the second server component and independent of the first server component, determining a second time period in which to apply a second power mode from the second plurality of power modes to the second server component; and
   configuring the second server component to operate in the second power mode of the second plurality of power modes, for at least the second time period.

7. The computer-implemented method of claim 1, wherein the second power mode is determined by an application configured such that the second power mode independently specifies each individual measure selected from: (i) a percentage of power to be consumed by the first server component, relative to a predefined maximum of power that the first server component consumes and (ii) an amount of power to be consumed by the first server component.

8. The computer-implemented method of claim 1, wherein the second power mode is determined by an application configured to independently determine, for each individual server component selected from a computer processor, a memory, a storage device, a network component, an input device, and an output device, the time period in which to apply the second power mode to the respective server component, based on the monitored utilization of the respective server component, wherein the time period is characterized by a lower level of utilization of the first server component, relative to other time periods.

9. The computer-implemented method of claim 8, whereby the first server component consumes a reduced amount of power during the time period while being in the second power mode, relative to the first power mode, wherein each of the plurality of power modes is characterized by a different amount of power consumed by the first server component, wherein the application is configured such that the second power mode independently specifies each individual measure selected from: (i) a percentage of power to be consumed by the first server component, relative to a predefined maximum of power that the first server component consumes and (ii) an amount of power to be consumed by the first server component.

10. The computer-implemented method of claim 9, further comprising:
monitoring utilization of a second server component having a second plurality of power modes and operating in a first power mode of the second plurality of power modes;
determining a second time period in which to apply a second power mode from the second plurality of power modes to the second server component, wherein the second power mode from the second plurality of power modes and the second time period in which to apply the second power mode from the second plurality of power modes are each determined based on the monitored utilization of the second server component and based further on the application registry, which specifies one or more time periods during which one or more performance-critical applications are executing and using the second server component; and
configuring the second server component to operate in the second power mode of the second plurality of power modes, for at least the second time period.

11. The computer-implemented method of claim 10, wherein the application is further configured to independently manage power consumption via each individual operation of a plurality of operations including:
increasing a voltage applied to the first server component;
decreasing the voltage applied to the first server component;
increasing a frequency of a clock signal associated with the first server component; and
decreasing the frequency of the clock signal associated with the first server component.

12. The computer-implemented method of claim 11, wherein the plurality of operations further includes:
partially disabling the first server component;
re-enabling a disabled part of the first server component;
fully disabling the first server component; and
fully re-enabling the disabled first server component.

13. The computer-implemented method of claim 12, wherein performance of the server components is purposely decreased in order to achieve cost savings associated with reduced power consumption of the server components.

14. The computer-implemented method of claim 13, wherein the application registry includes a plurality of registry entries, of which at least a first registry entry for a first performance-critical application is programmatically maintained by the application without requiring any user input, and at least a second registry entry for a second performance-critical application is maintained by an administrative user of the application, in order to indicate time periods during which performance-critical applications are executing and using the server components.

15. The computer-implemented method of claim 14, wherein the application is further configured to:
refrain from configuring any of a subset of server components to consume less power during a timeframe in which one or more performance-critical applications are executing and using the subset of server components.

16. The computer-implemented method of claim 15, wherein the application is further configured to:
store the second power mode and the time period in which to apply the second power mode in a power management policy.

17. The computer-implemented method of claim 16, wherein the application is further configured to:
independently override the power management policy based on each individual preset selected from:
(i) a first preset specifying a power mode different from the first and second power modes and the time period in which to apply the different power mode
(ii) a second preset specifying the second power mode and a different time period in which to apply the second power mode.

18. The computer-implemented method of claim 17, wherein each individual preset is specified by specified by the administrative user of the application, wherein the application is configured to refrain from applying second power mode, having a lower associated measure of power consumption during the first power mode, during a time period in which the one or more performance-critical applications are executing and using the component, in order to preclude an adverse impact on performance of the one or more performance-critical applications during the time period, wherein the second power mode is applied during a time period in which no performance-critical applications are executing.

19. The computer-implemented method of claim 18, wherein the first server component has power modes collectively characterized by a predefined range of percentages of power consumption of the first server component, relative to a predefined maximum power consumption of the first server component, wherein each power mode corresponds to a distinct percentage of power consumption within the predefined range.

20. The computer-implemented method of claim 19, wherein the server components include at least three server components including the first server component, wherein power consumption of each of the at least three server components is managed independently of one another, wherein in a first instance, a new power mode is applied to lower power consumption of a first of the at least three server components, while a new power mode is concurrently applied to increase power consumption of a second of the at least three server components.

* * * * *